(12) United States Patent
Kim (10) Patent No.: US 9,575,243 B2
(45) Date of Patent: Feb. 21, 2017

(54) DISPLAY APPARATUS

(75) Inventor: Gyunsoo Kim, Changwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 277 days.

(21) Appl. No.: 13/486,586

(22) Filed: Jun. 1, 2012

(65) Prior Publication Data

US 2013/0258702 A1 Oct. 3, 2013

(30) Foreign Application Priority Data

Mar. 28, 2012 (KR) .................. 10-2012-0031857

(51) Int. Cl.
*G02F 1/1335* (2006.01)
*F21V 8/00* (2006.01)
*G02F 1/1333* (2006.01)

(52) U.S. Cl.
CPC ..... *G02B 6/0091* (2013.01); *G02F 1/133608* (2013.01); *G02F 1/133308* (2013.01); *G02F 1/133615* (2013.01); *G02F 2001/13332* (2013.01); *G02F 2001/133314* (2013.01); *G02F 2001/133317* (2013.01); *G02F 2001/133322* (2013.01); *G02F 2201/46* (2013.01)

(58) Field of Classification Search
CPC ............... G02F 1/133602–1/133611; G02F 2001/133317; G02F 2001/133322; G02F 2001/133314; G02F 2001/13332; G02B 6/0001; G02B 6/0091
USPC ............ 362/97.1–97.4, 632–634; 349/58–60
See application file for complete search history.

(56) References Cited

U.S. PATENT DOCUMENTS

| | | | |
|---|---|---|---|
| 7,333,163 B2 * | 2/2008 | Huang et al. .................. 349/58 |
| 7,528,898 B2 | 5/2009 | Hashimoto | |
| 7,787,069 B2 | 8/2010 | Ito | |
| 2003/0103173 A1 * | 6/2003 | Satonaka .................. 349/58 |
| 2004/0062057 A1 * | 4/2004 | Ha et al. .................. 362/561 |
| 2004/0246397 A1 * | 12/2004 | Kang et al. .................. 349/58 |
| 2006/0290836 A1 * | 12/2006 | Chang .................. 349/58 |
| 2007/0241993 A1 * | 10/2007 | Monden et al. .................. 345/58 |
| 2007/0279547 A1 | 12/2007 | Tanaka | |
| 2008/0068530 A1 * | 3/2008 | Lee et al. .................. 349/58 |
| 2008/0079863 A1 * | 4/2008 | Jung et al. .................. 349/58 |
| 2009/0002601 A1 * | 1/2009 | Lee et al. .................. 349/65 |
| 2009/0180244 A1 * | 7/2009 | Kiyohara .................. 361/679.01 |
| 2009/0185097 A1 * | 7/2009 | Kim et al. .................. 349/58 |
| 2010/0118225 A1 * | 5/2010 | Lee .................. 349/58 |
| 2010/0328570 A1 * | 12/2010 | Kim et al. .................. 349/58 |

(Continued)

FOREIGN PATENT DOCUMENTS

| | | |
|---|---|---|
| JP | 2009122167 A | 6/2009 |
| JP | 2010102018 A | 5/2010 |

(Continued)

*Primary Examiner* — Jong-Suk (James) Lee
*Assistant Examiner* — Zheng Song
(74) *Attorney, Agent, or Firm* — Cantor Colburn LLP (57) ABSTRACT

A display apparatus includes a display unit which displays an image, a backlight unit which provides the display unit with a light, a receiving container which accommodates the backlight unit, and a supporting frame which is coupled to the receiving container and supports the display unit. The backlight unit includes a light incident area from which the light is emitted. The receiving container includes a guide bar which is adjacent to the light incident area of the backlight unit and coupled to the supporting frame.

15 Claims, 8 Drawing Sheets

(56) References Cited

U.S. PATENT DOCUMENTS

2011/0149192 A1* 6/2011 Son .................................. 349/58
2012/0092813 A1* 4/2012 Kao .................. G02F 1/133308
                 361/679.01

FOREIGN PATENT DOCUMENTS

| KR | 1020040062285 A | 7/2004 |
| KR | 1020060083262 A | 7/2006 |
| KR | 1020060085013 A | 7/2006 |
| KR | 1020060134285 A | 12/2006 |
| KR | 1020070029873 A | 3/2007 |
| KR | 1020100124145 A | 11/2010 |

* cited by examiner

DISPLAY APPARATUS

This application claims priority to Korean Patent Application No. 10-2012-0031857, filed on Mar. 28, 2012, and all the benefits accruing therefrom under 35 U.S.C. §119, the entire contents of which is hereby incorporated by reference for all purposes as if fully set forth herein.

BACKGROUND

1. Field

The disclosure relates to a display apparatus. More particularly, the disclosure relates to a display apparatus capable of improving a bonding strength between components thereof.

2. Description of the Related Art

In general, a flat panel display apparatus includes a display panel that displays an image, a backlight unit that provides the display panel with light, a receiving container that accommodates the backlight unit, and a cover member coupled with the receiving container to cover an edge of the display panel.

A supporting frame is further disposed between the receiving container and the cover member to support the display panel. The supporting frame prevents the backlight unit from being separated from the receiving container and supports the display panel. The cover member is coupled with the receiving container to prevent the display panel from being separated from the supporting frame.

A bezel of the display apparatus may be defined by portions of the display apparatus at a periphery around a viewing area of the display apparatus. The display apparatus employing a narrow bezel structure has been developed to reduce an overall outer size of the display apparatus. However, the narrow bezel structure causes deterioration of a bonding strength between the receiving container, the supporting frame and the cover member.

SUMMARY

One or more embodiments of the disclosure provides a display apparatus capable of improving a bonding strength between components of the display apparatus employing a narrow bezel structure.

Embodiments of the invention provide a display apparatus which includes a display unit which displays an image, a backlight unit which provides the display unit with a light, a receiving container which accommodates the backlight unit, and a supporting frame which is coupled to the receiving container and supports the display unit. The backlight unit includes a light incident area from which the light is emitted. The receiving container includes a guide bar which is adjacent to the light incident area of the backlight unit and coupled to the supporting frame.

According to the one or more embodiments, first and second fixing portions of the supporting frame in the light incident area are stably fixed to the receiving container by the guide bar, and thus movement of the supporting frame relative to the receiving container may be reduced or effectively prevented. As a result, a bonding strength between the supporting frame and the receiving container may be improved in the light incident area of the backlight unit, even when the display apparatus employs the narrow bezel structure.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "under," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
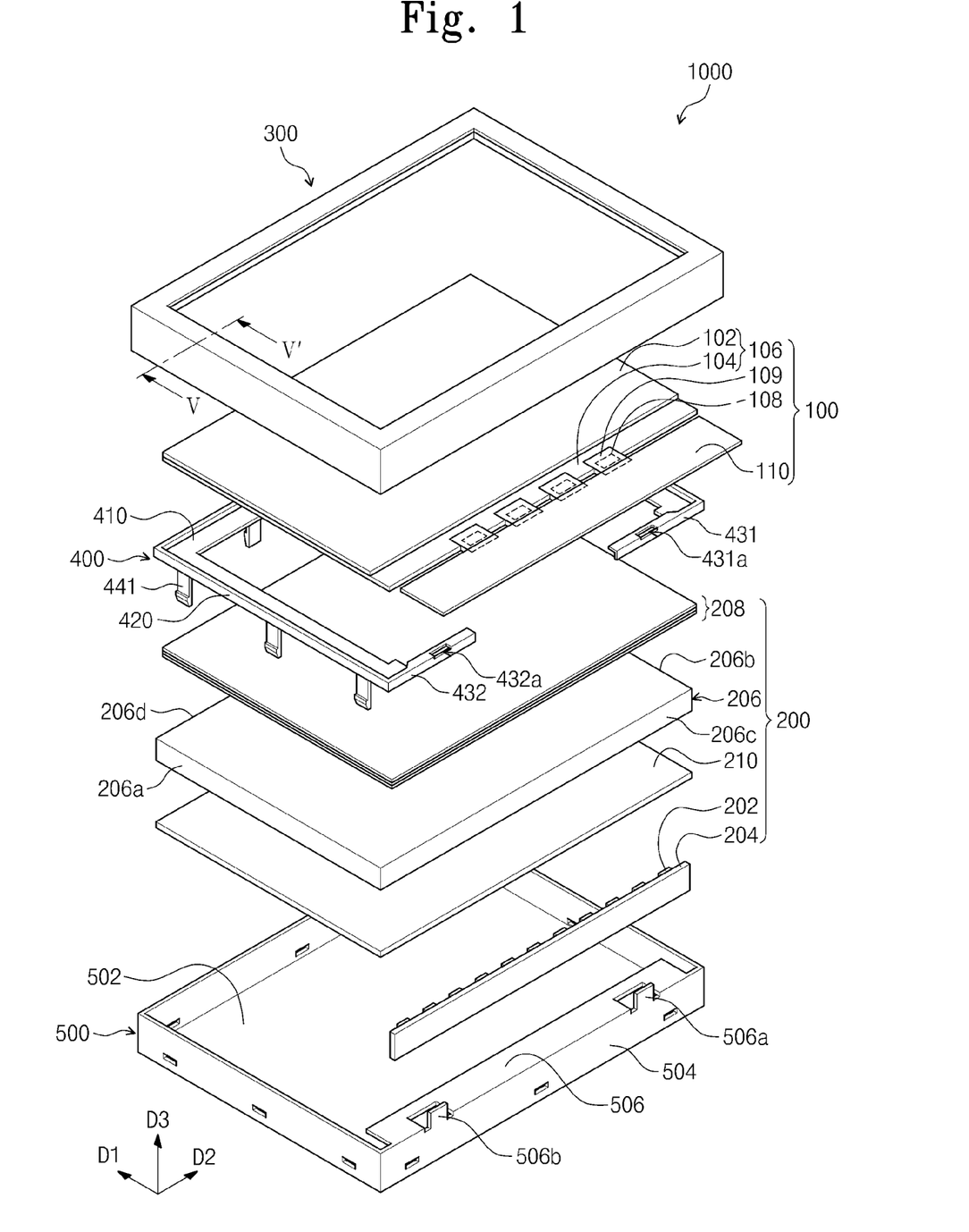
FIG. 1 is an exploded perspective view showing an exemplary embodiment of a display apparatus according to the invention.

FIG. 1 is an exploded perspective view showing an exemplary embodiment of a display apparatus according to the invention.

Referring to FIG. 1, a display apparatus 1000 includes a display unit 100, a backlight unit 200, a cover member 300, a supporting frame 400 and a receiving container 500.

The display apparatus 1000 has a rectangular shape when viewed in a plan view. In the exemplary embodiment, for the convenience of explanation, a short axis direction of the display apparatus 1000 is referred to as a first direction D1, and a long axis direction of the display apparatus 1000 is referred to as a second direction D2 substantially perpendicular to the first direction D1. In addition, the receiving container 500, the backlight unit 200, the supporting frame 400, the display unit 100, and the cover member 300 of the display apparatus 1000 are sequentially stacked in a third direction D3 substantially orthogonal (e.g., vertical in FIG. 1) to the first and second directions D1 and D2.

The display unit 100 includes a display panel 106 that displays an image, a driving chip 108 that applies a driving signal to the display panel 106, and a printed circuit board 110 that is electrically connected to the display panel 106.

The display panel 106 includes a first substrate 102, a second substrate 104 that faces the first substrate 102 while being coupled with the first substrate 102, and a liquid crystal layer (not shown) interposed between the first substrate 102 and the second substrate 104. While a liquid crystal display panel has been shown as the display panel 106 in FIG. 1, the display panel 106 should not be limited to the liquid crystal display panel.

The first substrate 102 includes a plurality of pixels arranged in a matrix form. In one exemplary embodiment, each pixel includes a gate line (not shown) extended in the first direction D1, a data line (not shown) extended in the second direction D2 and insulated from the gate line while crossing the gate line, and a pixel electrode (not shown). In addition, each pixel includes a thin film transistor (not shown) connected to the gate line, the data line and the pixel electrode.

The second substrate 104 includes red, green and blue ("RGB") pixels (not shown) as color pixels, and a common electrode (not shown) facing the pixel electrode of the first substrate 102. The color pixels and the common electrode may be disposed on the first substrate 102 according to alternative embodiments. The liquid crystal layer includes liquid crystal molecules arranged in accordance with an intensity of an electric field generated between the pixel electrode and the common electrode, so that a transmittance of light passing through the liquid crystal layer is controlled by the liquid crystal molecules. As a result, a desired image may be displayed on the display panel 106.

The driving chip 108 may be disposed adjacent to at least one side of the first substrate 102 in the plan view, to apply a data signal to the data line. The driving chip 108 generates the data signal in response to an external signal and the data signal is applied to the data line of the display panel 106. The external signal is provided from the printed circuit board 110 and includes various signals, such as an image signal, various control signals, a driving voltage, etc.

The first substrate 102 may include a gate driving circuit on a side opposite to the at least one side of the first substrate 102, to apply a gate signal to the gate line. The gate driving circuit may be on the opposite side such as through a thin film process during forming of the display apparatus. Thus, the gate driving circuit may be within the display panel 106.

As another alternative embodiment, the driving chip 108 may be provided with at least two chips, e.g., data and gate driving chips, and mounted on the first substrate 102 through a chip-on-glass ("COG").

The printed circuit board 110 is electrically connected to the display panel 106 by a plurality of tape carrier packages ("TCPs") 109. The driving chip 108 is mounted on the TCPs 109 and the TCPs 109 are bent to surround a side surface of the receiving container 500.

The printed circuit board 110 connected to the TCPs 109 is disposed under the receiving container 500. Where the printed circuit board 110 is under the receiving container 500, the display apparatus 1000 further includes a shield case (not shown) disposed under the receiving container 500 to protect the printed circuit board 110.

The backlight unit 200 includes a light source 202 that generates and emits the light, and a light guide plate 206 that guides the light from the light source 202 to the display unit 100.

In the exemplary embodiment, the backlight unit 200 may be, but is not limited to, an edge-illumination type backlight unit. That is, the light source 202 of the backlight unit 200 provides the light to at least one side surface of the light guide plate 206 which is under and overlapping the display panel 106, and the light guide plate 206 guides the light to the display unit 100.

The light guide plate 206 includes a first side surface 206a having a longitudinal axis extended in the first direction D1 of the display apparatus 1000, a second side surface 206b substantially parallel to the first side surface 206a, a third side surface 206c having a longitudinal axis extended in the second direction D2 of the display apparatus 1000, and a fourth side surface 206d substantially parallel to the third side surface 206c. In the exemplary embodiment, the light source 202 is disposed adjacent to the third side surface 206c of the light guide plate 206, but the invention is not limited thereto or thereby. In an alternative exemplary embodiment, the light source 202 may be disposed adjacent to the first, second and/or fourth side surfaces 202a, 202b and 202d of the light guide plate 206.

The backlight unit 200 may further include a light source supporter 204 to support the light source 202. The light source supporter 204 is disposed to face the third side surface 206c of the light guide plate 206, and has a substantially flat and uniform thickness plate-like shape. The light source 202 includes a plurality of light emitting diodes. The light emitting diodes are arranged on the light source supporter 204 along the second direction D2 to be spaced apart from each other.

The backlight unit 200 further includes a plurality of optical sheets 208 disposed between the light guide plate 206 and the display unit 100, and a reflective plate 210 disposed under the light guide plate 206.

The optical sheets 208 include a diffusion sheet that diffuses the light and at least one light condensing sheet that condenses the light so as to improve brightness and viewing angle of the light exiting from an exit surface of the light guide plate 206. The reflective plate 210 reflects the light leaked from a reflective surface of the light guide plate 206 without being directed to the optical sheet 208, so that the light reflected by the reflective plate 210 is incident again to the light guide plate 206.

The receiving container 500 includes a bottom portion 502 on which the backlight unit 200 is mounted, a sidewall 504 extended in a vertical direction, e.g., the third direction D3, from the bottom portion 502, and a cover portion 506 extended from the sidewall 504 in a direction substantially parallel to the bottom portion 502 to cover the light source 202.

The supporting frame 400 is disposed between the display unit 100 and the backlight unit 200 to support the display panel 106. The supporting frame 400 includes a supporter 410 to support the display panel 106 and a sidewall 420 extended from the supporter 410 toward the third direction D3. Although not shown in figures, a portion of the supporter 410 and/or the sidewall 420 of the supporting frame 400, which is adjacent to the light source 202, is absent from the supporting frame 400 to expose the cover portion 506 of the receiving container 500. Where portions of the supporter 410 and/or the sidewall 420 are absent, the display panel 106 may be mounted on the cover portion 506 in the area (hereinafter, referred to as a light incident area) adjacent to the light source 202.

The supporting frame 400 may be coupled with the receiving container 500. The coupling structure between the supporting frame 400 and the receiving container 500 will be described in later drawings.

The cover member 300 faces the receiving container 500 and is coupled with the receiving container 500 to cover the edge of the display panel 106. In the exemplary embodiment, the cover member 300 and/or the receiving container 500 may include a metal material.

Figure 2:
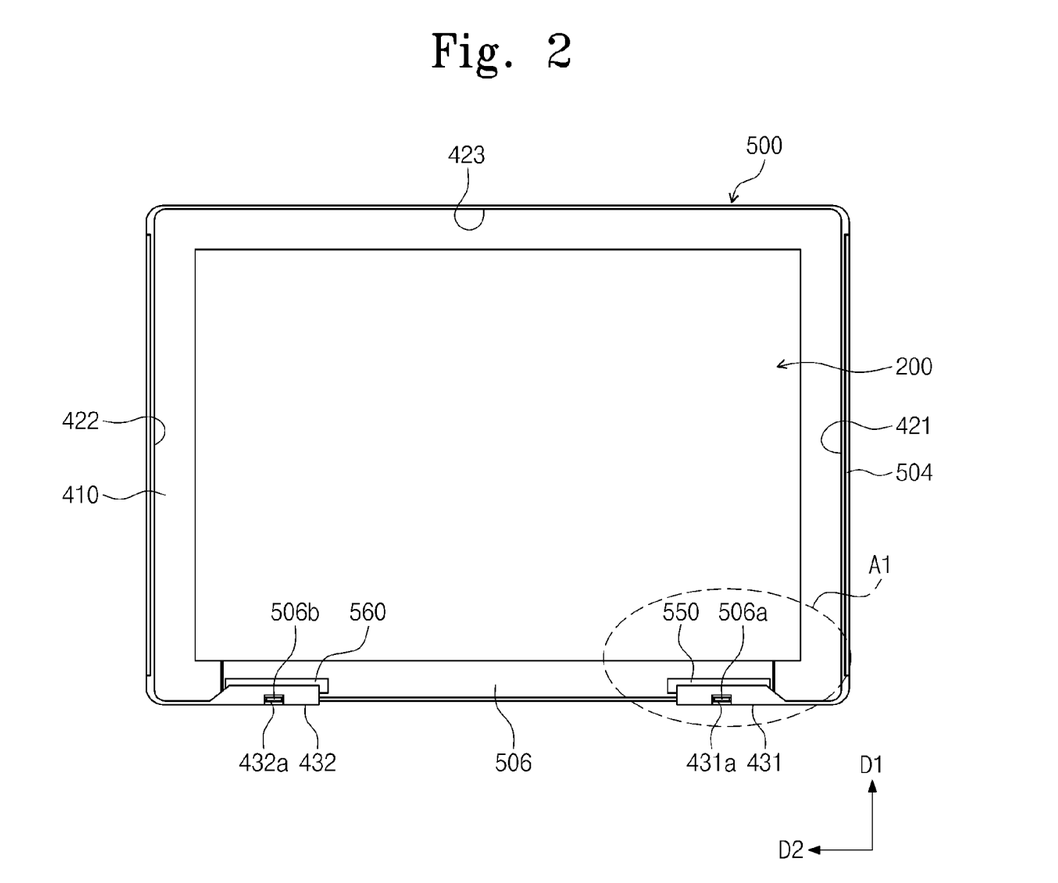
FIG. 2 is a plan view showing an exemplary embodiment of a coupling structure between a receiving container and a supporting frame shown in FIG. 1.
Figure 3:
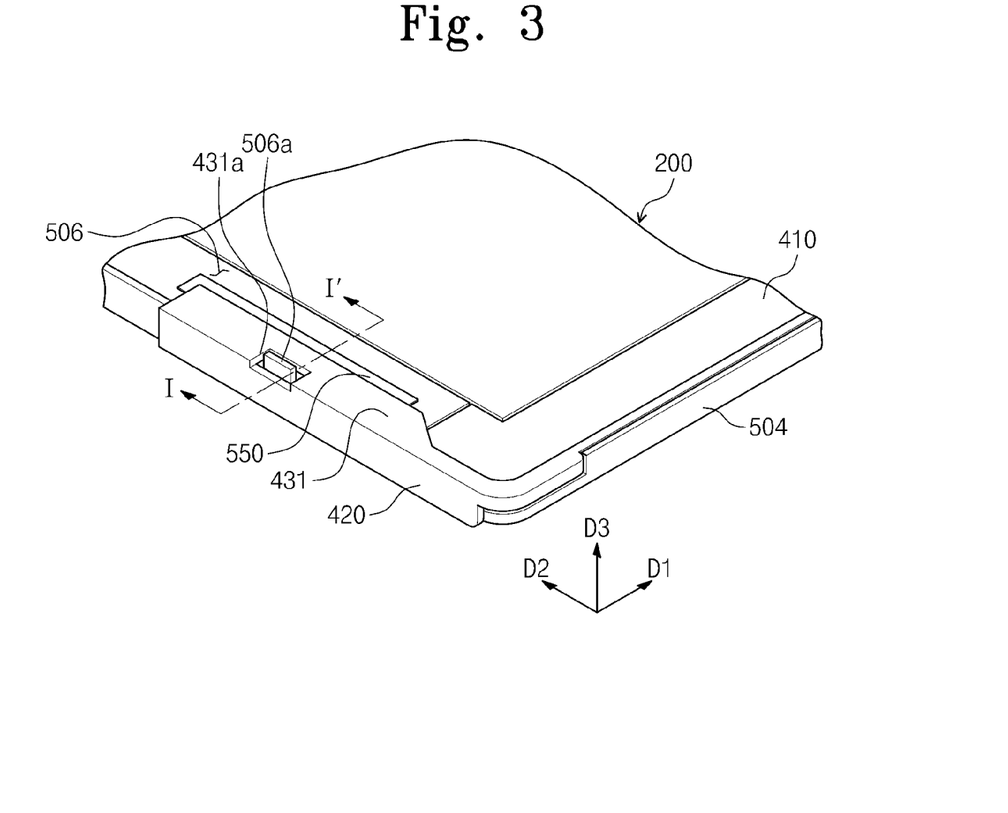
FIG. 3 is an enlarged perspective view of portion A1 shown in FIG. 2.
Figure 4:
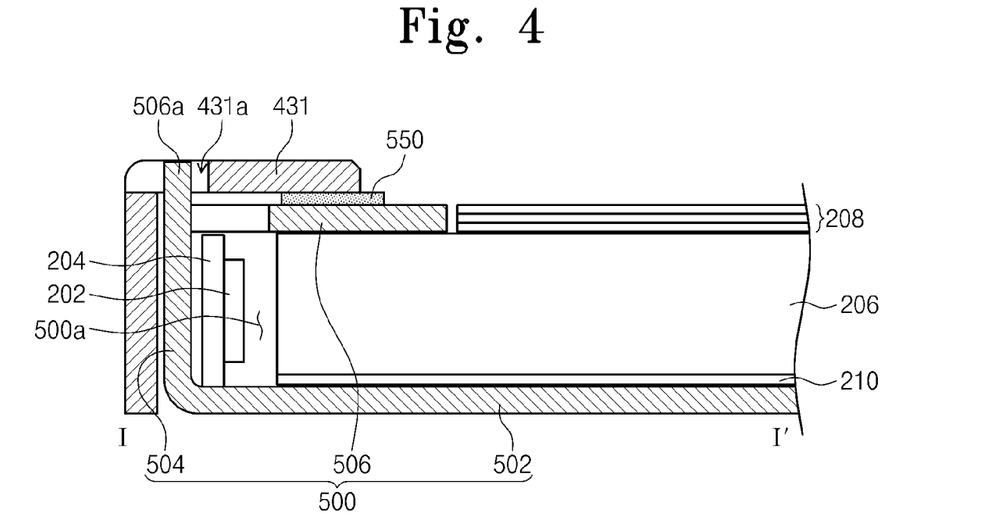
FIG. 4 is a cross-sectional view taken along line I-I' shown in FIG. 3.

FIG. 2 is a plan view showing an exemplary embodiment of a coupling structure between the receiving container 500 and the supporting frame 400 shown in FIG. 1, FIG. 3 is an enlarged perspective view of portion A1 shown in FIG. 2, and FIG. 4 is a cross-sectional view taken along line I-I' shown in FIG. 3.

Referring to FIG. 2 to FIG. 4, the receiving container 500 includes the bottom portion 502 on which the backlight unit 200 is mounted, the sidewall 504 extended from the bottom portion 502, and the cover portion 506 extended from the sidewall 504 in the direction substantially parallel to the bottom portion 502 to cover the light source 202. The reflective plate 210, the light guide plate 206 and the optical sheet 208 of the backlight unit 200 are sequentially stacked one on another on the bottom portion 520, and the light source supporter 204 and the light source 202 are accommodated in a light source receiving space 500a defined by at least the bottom portion 502, the sidewall 504 and the cover portion 506.

When the components of the backlight unit 200 are sequentially accommodated in the receiving container 500, the supporting frame 400 is disposed on the receiving container 500.

The supporting frame 400 includes a first sidewall 421 having a longitudinal axis extended in the first direction D1, a second sidewall 422 substantially parallel to the first sidewall 421, and a third sidewall 423 having a longitudinal axis extended in the second direction D2. The first and second sidewalls 421 and 422 are connected with each other by the third sidewall 423. The supporting frame 400 includes the supporter 410 extended from the first, second, and third sidewalls 421, 422, and 423 and substantially parallel to the bottom portion 502 of the receiving container 500.

In the light incident area, the cover portion 506 of the receiving container 500 and a portion of the sidewall 504 connected with the cover portion 506 are exposed without being overlapped by the supporting frame 400. However, the supporting frame 400 includes a first fixing portion 431 and a second fixing portion 432 in the light incident area, to be coupled with the receiving container 500. In detail, the first fixing portion 431 has a longitudinal axis which is extended from the first sidewall 421 toward the second sidewall 422 and in a direction substantially parallel to the third sidewall 423, and the second fixing portion 432 has a longitudinal axis which is extended from the second sidewall 422 toward the first sidewall 421 and in the direction substantially parallel to the third sidewall 423. Each of the first and second fixing portions 431 and 432 includes a first portion substantially parallel to the bottom portion 502 of the receiving container 500. The first and second fixing portion 431 and 432 may also be considered as including a second portion substantially perpendicular to the bottom portion 502 of the receiving container 500, where the second portion may be considered a part of the sidewall 420 of the supporting frame 400.

The first and second fixing portions 431 and 432, the first to third sidewalls 421 to 423, the supporter 410 and the sidewall 420 may collectively form a single, unitary, indivisible supporting frame 400 member. While a coupling structure between the first fixing portion 431 and the receiving container 500 has been shown in FIG. 3 and FIG. 4, the second fixing portion 432 is coupled to the receiving container 500 in the substantially similar manner as the first fixing portion 431, and a repetitive detailed description of the coupling between the second fixing portion 432 and the receiving container 500 is omitted.

Each of the first and second fixing portions 431 and 432 covers (e.g., overlaps) an upper surface of the cover portion 506 and a portion of the sidewall 504. A first fixing member 550 is disposed between the first fixing portion 431 and the cover portion 506, and a second fixing member 560 is disposed between the second fixing portion 432 and the cover portion 506. The first and second fixing members 550 and 560 may have adhesive characteristics, such as a double-sided adhesive tape, but the invention is not limited thereto or thereby. Therefore, the supporting frame 400 may be fixed to the upper surface of the cover portion 506 of the receiving container 500 by the first and second fixing members 550 and 560.

In FIG. 2, the first and second fixing portions 431 and 432 are separated from each other in the second direction D2, but they should not be limited thereto or thereby. That is, the first and second fixing portions 431 and 432 may be integral with each other according to embodiments, such that the first and second fixing portions 431 and 432 collectively form a single, unitary, indivisible member, but the invention is not limited thereto or thereby.

In addition, the receiving container 500 includes a first guide bar 506a and a second guide bar 506b, which are protruded from the upper surface of the cover portion 506. In an exemplary embodiment of forming the display apparatus 1000, the first and second guide bars 506a and 506b may be formed by cutting away portions of the cover portion 506, and bending such cut portions away from the cover portion 506. The first and second guide bars 506a and 506b, the cover portion 506, the sidewall 504 and the bottom portion 502 may collectively form a single, unitary, indivisible member, but the invention is not limited thereto or thereby.

The first fixing portion 431 is provided with a first fixing hole 431a which extends through a thickness thereof, and is coupled to the first guide bar 506a of the receiving container 500, and the second fixing portion 432 is provided with a second fixing hole 432a which extends through a thickness thereof, and is coupled to the second guide bar 506b of the receiving container 500. Since the first and second guide bars 506a and 506b of the receiving container 500 are respectively coupled to the first and second fixing holes 431a and 432a of the first and second fixing portions 431 and 432, movement of the supporting frame 400 in the first and second directions D1 and D2 may be reduced or effectively prevented.

The first and second fixing members 550 and 560 may reduce or effectively prevent the supporting frame 400 from moving in the third direction D3.

Accordingly, the bonding strength between the supporting frame 400 and the receiving container 500 may be improved in the light incident area.

Particularly, when the display apparatus 1000 includes a narrow bezel structure, a width of the first and second fixing portions 431 and 432 becomes narrow in a direction perpendicular to the longitudinal axis thereof, and thus a region, in which the first and second fixing members 550 and 560 are attached, becomes narrow. As a result, it may be difficult to maintain a bonding strength between the supporting frame 400 and the receiving container 500 only by using the first and second fixing members 550 and 560.

As in the above-mentioned exemplary embodiment, when the first and second fixing portions 431 and 432 are fixed to the receiving container 500 using the first and second guide bars 506a and 506b, the bonding strength between the supporting frame 400 and the receiving container 500 may be improved in the display apparatus 1000 employing the narrow bezel structure.

Figure 5:
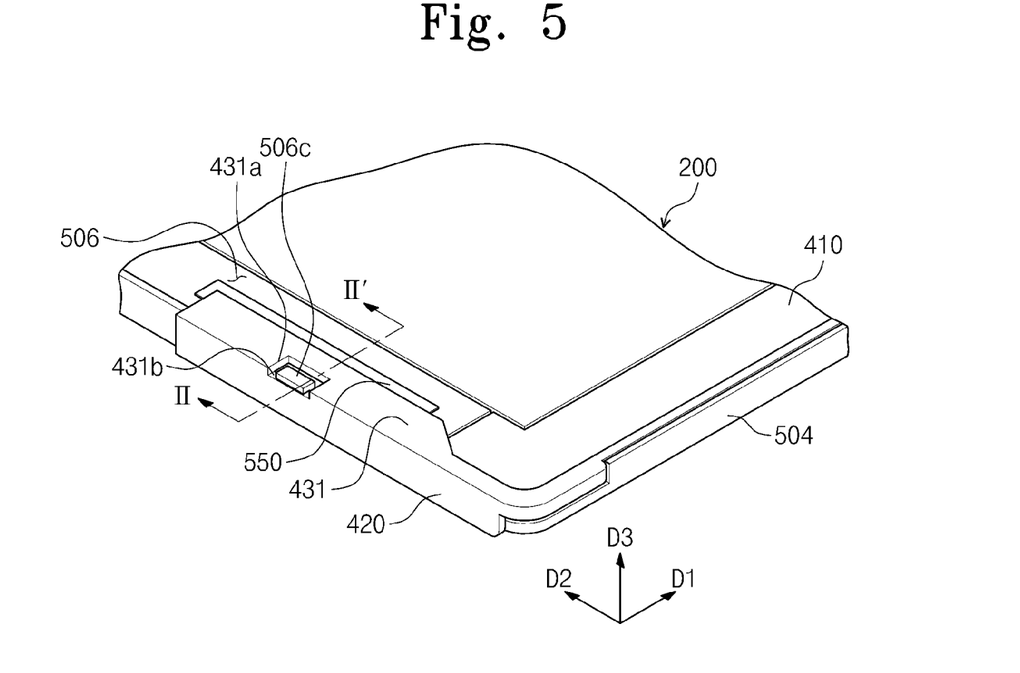
FIG. 5 is an enlarged perspective view showing another exemplary embodiment of portion A1 shown in FIG. 2 of a display apparatus according to the invention.
Figure 6:
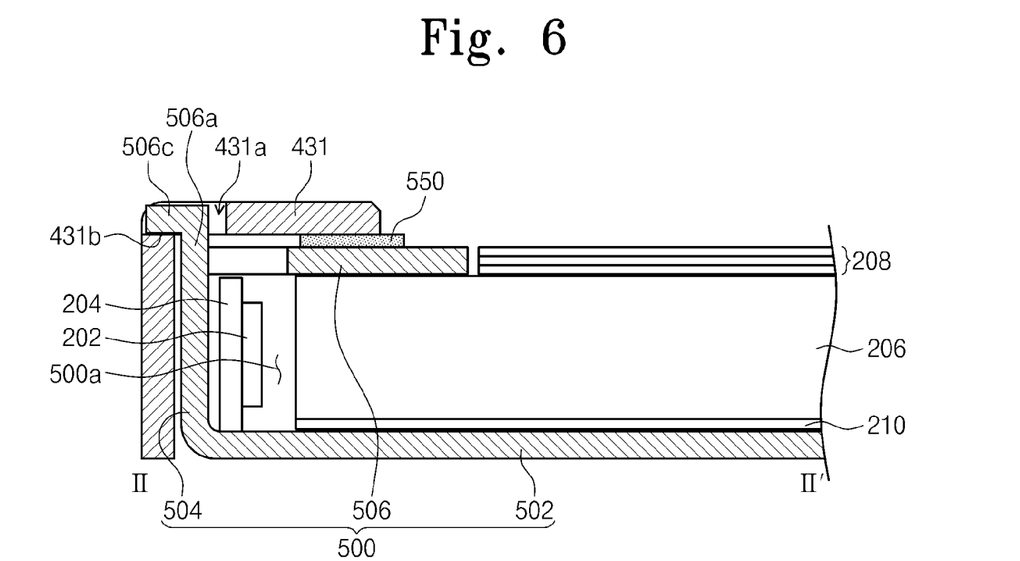
FIG. 6 is a cross-sectional view taken along line II-II' shown in FIG. 5.

FIG. 5 is an enlarged perspective view showing another exemplary embodiment of portion A1 of a display apparatus according to the invention, and FIG. 6 is a cross-sectional view taken along line II-II' shown in FIG. 5. In FIG. 5 and FIG. 6, the same reference numerals denote the same elements in FIG. 3 and FIG. 4, and thus detailed descriptions of the same elements will be omitted. In addition, a coupling structure between the first fixing portion 431 and the receiving container 500 has been shown in FIG. 5 and FIG. 6, but the second fixing portion 432 is coupled to the receiving container 500 in the substantially similar manner as the first fixing portion 431.

Referring to FIG. 5 and FIG. 6, the supporting frame 400 is stably fixed to the receiving container 500 by coupling the first and second fixing portions 431 and 432 to the receiving container 500 in the light incident area.

In detail, the supporting frame 400 includes the first fixing portion 431 having a longitudinal axis extended from the first sidewall 421 in the direction substantially parallel to the third sidewall 423 and the second fixing portion 432 having a longitudinal axis extended from the second sidewall 422 in the direction substantially parallel to the third sidewall 423.

Each of the first and second fixing portions 431 and 432 covers the portion of the upper surface of the cover portion 506 and the portion of the sidewall 504. The first fixing member, such as double-sided adhesive tape, 550 is disposed between the first fixing portion 431 and the cover portion 506, and the second fixing member, such as double-sided adhesive tape, 560 is disposed between the second fixing portion 432 and the cover portion 506. Therefore, the supporting frame 400 may be fixed to the upper surface of the cover portion 506 of the receiving container 500 by the first and second fixing members 550 and 560.

In addition, the receiving container 500 includes a first guide bar 506a and a second guide bar 506b, which are protruded from the upper surface of the cover portion 506. The receiving container 500 further includes a first catching protrusion 506c outwardly protruded from one side edge of the first guide bar 506a and bent from the one side edge of the first guide bar 506a, and a second catching protrusion (not shown) outwardly protruded from one side edge of the second guide bar 506b and bent from the one side edge of the second guide bar 506b.

The first fixing portion 431 is provided with a first fixing hole 431a which extends through a thickness thereof and is coupled to the first guide bar 506a, and the second fixing portion 432 is provided with a second fixing hole 432a which extends through a thickness thereof and is coupled to the second guide bar 506b. The first and second guide bars 506a and 506b of the receiving container 500 are respectively inserted into the first and second fixing holes 431a and 432a of the first and second fixing portions 431 and 432. Thus, movement of the supporting frame 400 in the first and second directions D1 and D2 may be reduced or effectively prevented by the first and second guide bars 506a and 506b.

The first catching protrusion 506c of the receiving container 500 is engaged with a first catching jaw 431b of the first fixing portion 431 of the supporting frame 400. In an exemplary embodiment of forming the display apparatus, the first catching jaw 431b may be formed by cutting away a portion of the first fixing portion 431 adjacent to the first fixing hole 431a. In addition, although not shown in FIGS. 5 and 6, the second catching protrusion is engaged with a second catching jaw (not shown) of the second fixing portion 432, which may be formed by cutting away a portion of the second fixing portion 432 adjacent to the second fixing hole 432a. The first catching protrusion 506c and the second catching protrusion may respectively overlap the sidewall 420 of the supporting frame 400 at the first and second fixing holes 431a and 432a. Accordingly, movement of the receiving container 500 in the third direction D3 may be further reduced or effectively prevented by using the first catching protrusion 506c and the second catching protrusion.

When the first catching protrusion 506c and the second catching protrusion of the receiving container 500 are engaged with the first and second fixing portions 431 and 432 of the supporting frame 400, the first fixing member 550 disposed between the first fixing portion 431 and the receiving container 500 and/or the second fixing member 560 disposed between the second fixing portion 432 and the receiving container 500, may be omitted.

Figure 7:
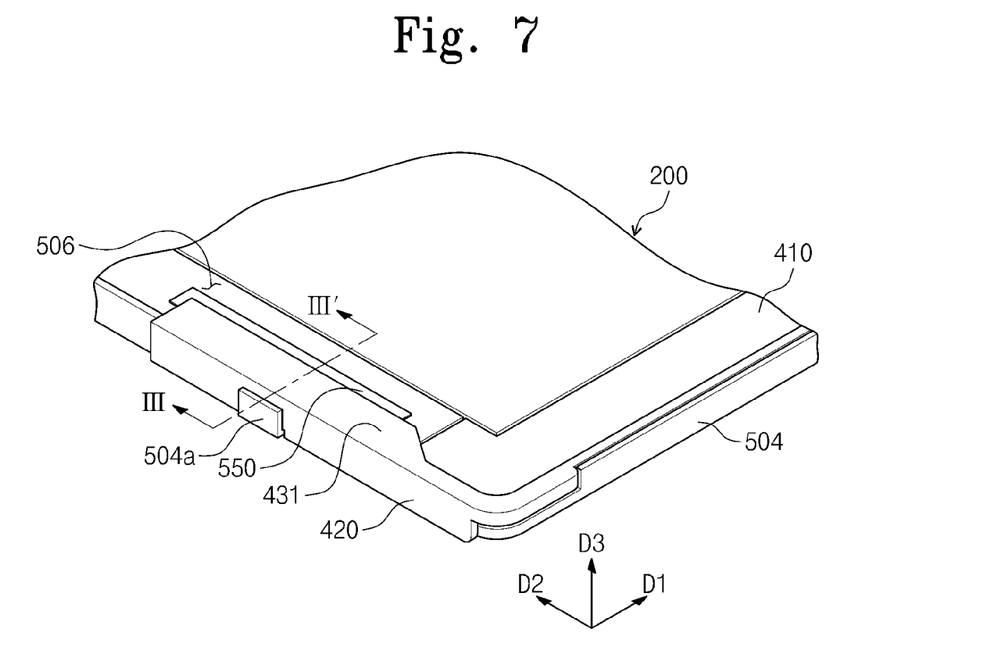
FIG. 7 is an enlarged perspective view showing another exemplary embodiment of portion A1 of a display apparatus according to the invention.
Figure 8:
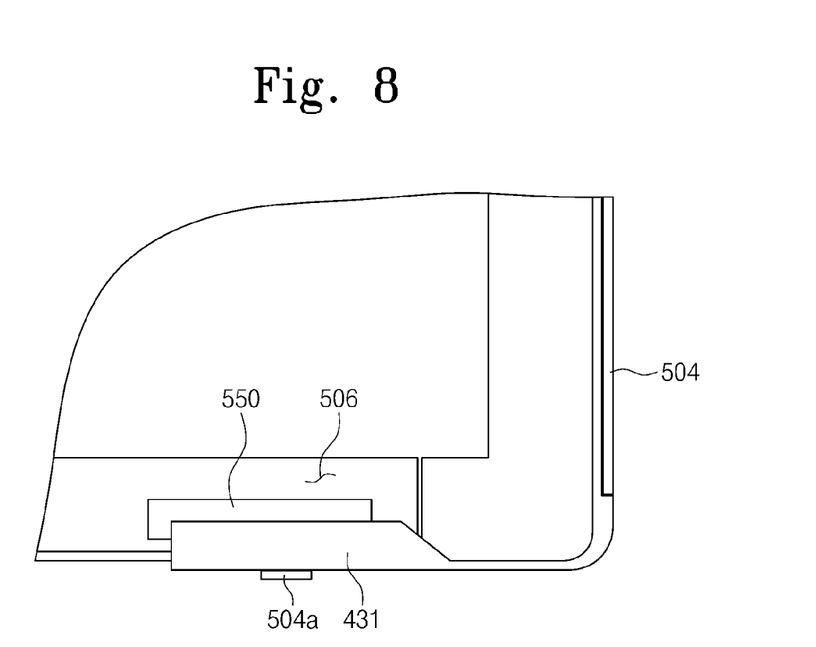
FIG. 8 is a plan view of portion A1 of the display apparatus shown in FIG. 7.
Figure 9:
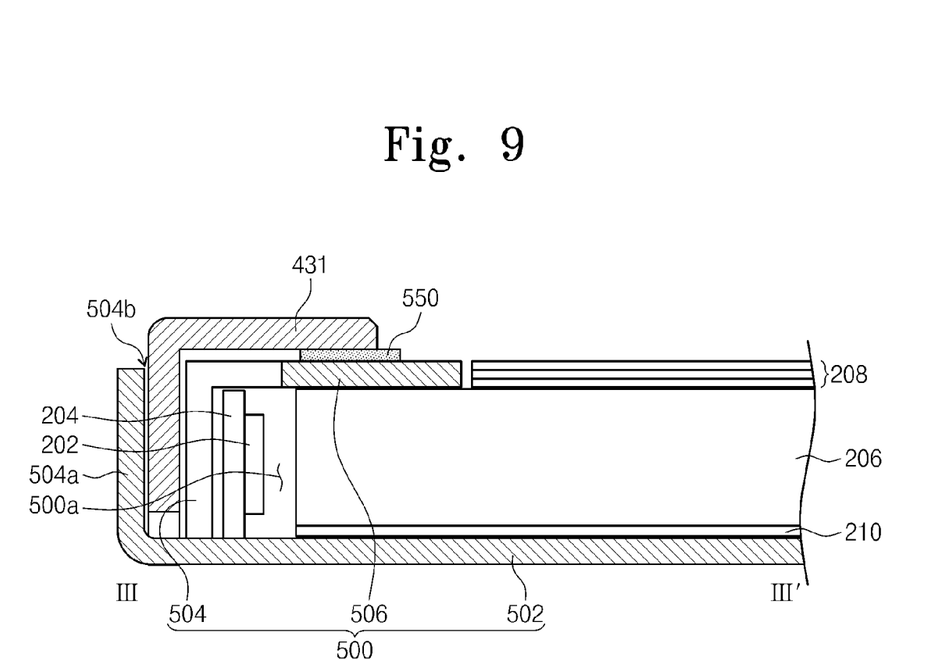
FIG. 9 is a cross-sectional view taken along line III-III' shown in FIG. 7.

FIG. 7 is an enlarged perspective view showing another exemplary embodiment of portion A1 of a display apparatus according to the invention, FIG. 8 is a plan view showing portion A1 of the display apparatus shown in FIG. 7, and FIG. 9 is a cross-sectional view taken along line III-III' shown in FIG. 7. In FIG. 7 to FIG. 9, the same reference numerals denote the same elements in FIG. 3 and FIG. 4, and thus detailed descriptions of the same elements will be omitted. In addition, a coupling structure between the first fixing portion 431 and the receiving container 500 has been shown in FIG. 7 to FIG. 9, but the second fixing portion 432 is coupled to the receiving container 500 in the substantially similar manner as the first fixing portion 431.

Referring to FIG. 7 to FIG. 9, the supporting frame 400 is stably fixed to the receiving container 500 by coupling the first and second fixing portions 431 and 432 to the receiving container 500 in the light incident area.

In detail, the supporting frame 400 includes the first fixing portion 431 having a longitudinal axis extended from the first sidewall 421 in the direction substantially parallel to the third sidewall 423 and the second fixing portion 432 having a longitudinal axis extended from the second sidewall 422 in the direction substantially parallel to the third sidewall 423.

Each of the first and second fixing portions 431 and 432 covers the portion of the upper surface of the cover portion 506 and the portion of the sidewall 504. The first fixing member, such as a double-sided adhesive tape, 550 is disposed between the first fixing portion 431 and the cover portion 506, and the second fixing member, such as a double-sided adhesive tape, 560 is disposed between the second fixing portion 432 and the cover portion 506. Therefore, the supporting frame 400 may be fixed to the upper surface of the cover portion 506 of the receiving container 500 by the first and second fixing members 550 and 560.

In addition, the receiving container 500 includes a third guide bar 504a protruded from the sidewall 504 thereof. In an exemplary embodiment of forming the display apparatus, the third guide bar 504a may be formed by cutting away a portion of the sidewall 504 of the receiving container 500. In addition, the third guide bar 504a may have a longitudinal axis which is extended substantially parallel to the sidewall 504. Accordingly, a space 504b is provided between the third guide bar 504a and the sidewall 504, into which a sidewall of the first fixing portion 431 is insertable. The sidewall of the first fixing portion 431 may be a part of the sidewall 420 of the supporting frame 400. A portion of a lower end of the sidewall of the first fixing portion 431 may be absent to accommodate a portion of the third guide bar 504a.

When the sidewall of the first fixing portion 431 is inserted into the space 504b, the third guide bar 504a may prevent separation of the first fixing portion 431 from the receiving container 500.

Although not shown in FIGS. 7 to 9, the receiving container 500 further includes a fourth guide bar protruded from the sidewall 504 and adjacent to the second fixing portion 432 of the supporting frame 400. Thus, a sidewall of the second fixing portion 432 may be inserted into a space between the fourth guide bar and the sidewall 504 of the receiving container.

As described above, movement of the first and second fixing portions 431 and 432 in the first and second directions D1 and D2 may be reduced or effectively prevented by using the third guide bar 504a and the fourth guide bar. As a result, the bonding strength between the supporting frame 400 and the receiving container 500 of the display apparatus may be improved in the light incident area even when the display apparatus employs the narrow bezel structure.

Figure 10:
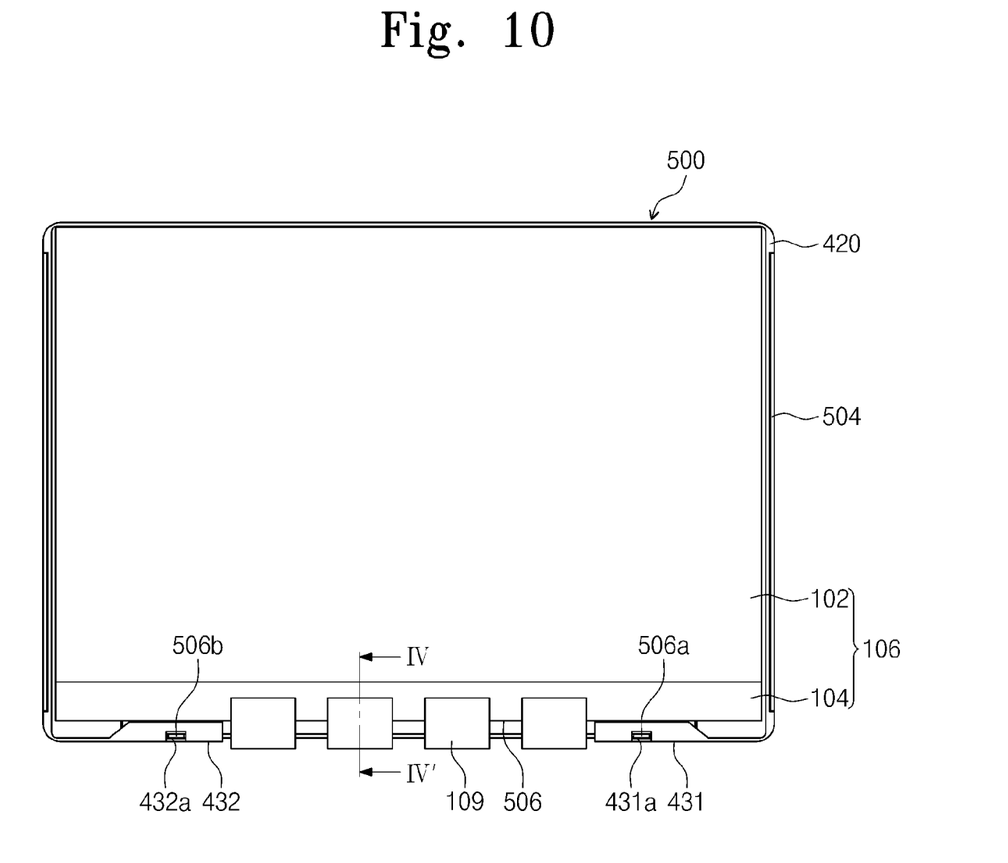
FIG. 10 is a plan view showing an exemplary embodiment of a display unit disposed on the supporting frame shown in FIG. 2.
Figure 11:
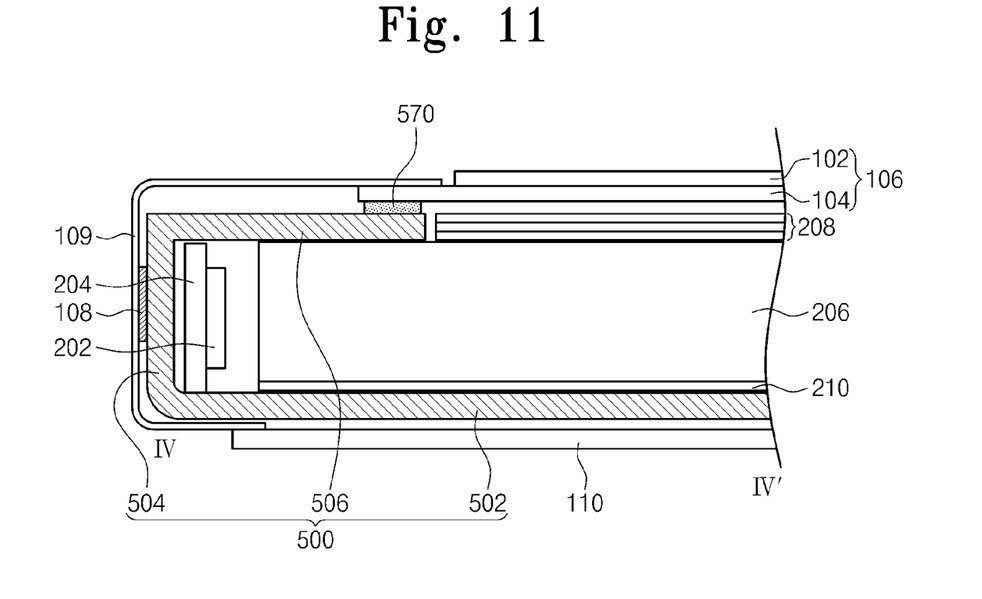
FIG. 11 is a cross-sectional view taken along line IV-IV' shown in FIG. 10.

FIG. 10 is a plan view showing an exemplary embodiment of a display unit disposed on the supporting frame shown in FIG. 2, and FIG. 11 is a cross-sectional view taken along line IV-IV' shown in FIG. 10.

Referring to FIG. 10 and FIG. 11, the display panel 106 is disposed on the supporter 410 of the supporting frame 400 and on the cover portion 506 of the receiving container 500.

A third fixing member, such as a double-sided adhesive tape, 570 is attached onto the upper surface of the cover portion 506 of the receiving container 500. Due to the third fixing member 570, a rear surface of the display panel 106 is fixed to the cover portion 506 of the receiving container 500. Therefore, the third fixing member 570 may reduce or effectively prevent separation of the display panel 106 from the supporter 410 of the supporting frame 400 and/or the cover portion 506 of the receiving container 500.

The TCPs 109 are attached at a side of the display panel 106. The TCPs 109 are bent to surround the sidewall 504 of the receiving container 500, and the printed circuit board 110 is disposed facing a rear surface of the receiving container 500. The driving chip 108 mounted on each of the TCPs 109 may face the sidewall 504 of the receiving container 500.

As shown in FIG. 10, the TCPs 109 may be positioned within the area between the first and second fixing portions 431 and 432 of the supporting frame 400, at the light incident area of the display apparatus.

Figure 12:
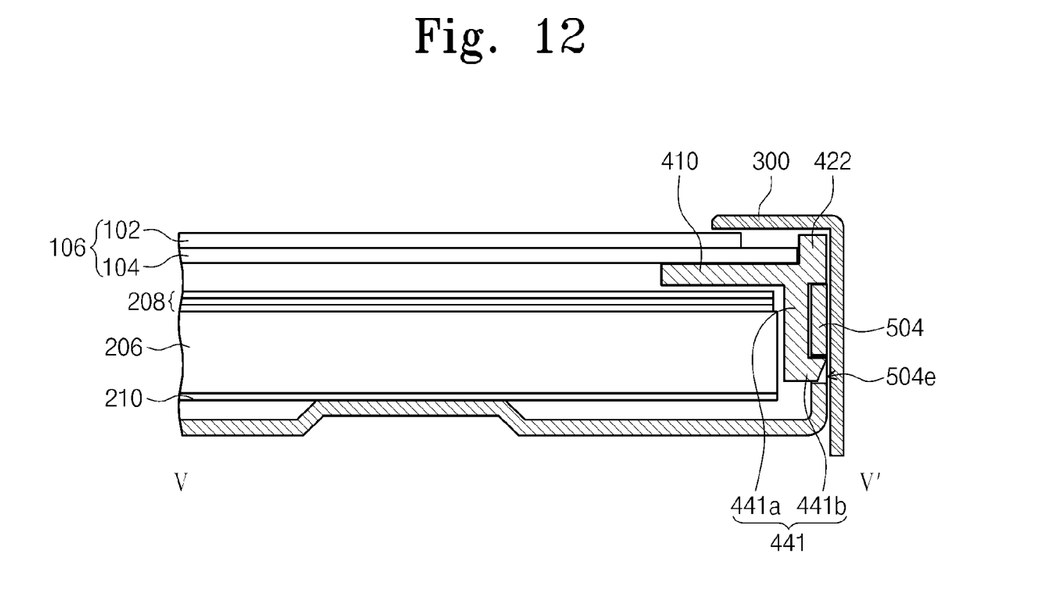
FIG. 12 is a cross-sectional view taken along line V-V' shown in FIG. 1.

FIG. 12 is a cross-sectional view taken along line V-V' shown in FIG. 1.

Referring to FIG. 12, each of the first, second, and third sidewalls 421, 422, and 423 of the supporting frame 400 includes at least one hook portion 441 thereon. The hook portion 441 engages with the receiving container 500 to be coupled to the sidewall 504 of the receiving container 500.

For the convenience of explanation, only the hook 441 on the second sidewall 422 of the supporting frame 400 has been shown in FIG. 12.

The hook 441 includes an extension portion 441a having a longitudinal axis extended substantially parallel to the sidewall 504 of the receiving container 500, and a catching portion 441b outwardly protruded from the extension portion 441a. The sidewall 504 of the receiving container 500 includes a catching hole 504e extended through a thickness of the sidewall 504, and the catching hole 504e is engaged with the catching portion 441b.

Accordingly, the second sidewall 422 of the supporting frame 400 may be fixed to the receiving container 500 by engaging the hook 441 with the catching hole 504e of the sidewall 504 of the receiving container 500.

Although not shown in FIG. 12, each of the first and third sidewalls 421 and 423 may include a hook having the same structure as the hook 441 provided on the second sidewall 422, and thus the first and third sidewalls 421 and 423 may be fixed to the receiving container 500 in a substantially similar manner of coupling.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A display apparatus comprising:
   a display unit which displays an image;
   a backlight unit comprising a light source which provides the display unit with a light;
   a receiving container which accommodates the backlight unit and comprises:

a bottom portion which accommodates the backlight unit thereon;

a sidewall which extends from the bottom portion;

a cover portion which extends from the sidewall extended from the bottom portion of the receiving container, in a first direction and substantially parallel to the bottom portion to overlap the light source; and a bar which extends from an upper surface of the cover portion which overlaps the light source, substantially vertical to the bottom portion; and a supporting frame between the display unit and the receiving container to support the display unit, the supporting frame comprising:

a first sidewall and a second sidewall, a first fixing portion which extends from the first sidewall of the supporting frame in the first direction, and a second fixing portion which extends from the second sidewall of the supporting frame in the first direction, the second fixing portion separated from the first fixing portion to expose a portion of the cover portion overlapping the light source, wherein the exposed portion of the cover portion overlapping the light source extends from between the separated first and second fixing portions to respectively overlap the first and second fixing portions separated from each other, and the separated first and second fixing portions respectively overlapped by the extended portion of the exposed cover portion are coupled to the extended portion of the exposed cover portion by the bar of the receiving container.

2. The display apparatus of claim 1, wherein the display unit comprises:

a display panel which displays the image;

a plurality of flexible films which is attached to the display panel; and a printed circuit board in electrical connection with the display panel by the plurality of flexible films.

3. The display apparatus of claim 2, wherein the display panel is on the supporting frame, and on the cover portion of the receiving container, the plurality of flexible films is bent and overlap the cover portion and the sidewall of the receiving container, and the printed circuit board faces a rear surface of the bottom portion of the receiving container.

4. The display apparatus of claim 3, wherein the plurality of flexible films is between the first and second fixing portions of the supporting frame.

5. The display apparatus of claim 3, further comprising a fixing member which is attached onto the cover portion of the receiving container and fixes the display panel to the cover portion.

6. The display apparatus of claim 1, wherein the first and second fixing portions of the supporting frame comprise a hole defined therein, and the hole is coupled to the bar of the receiving container.

7. The display apparatus of claim 6, wherein the receiving container further comprises a protrusion which continuously extends from an edge of the bar, and is inserted into the hole of the supporting frame.

8. The display apparatus of claim 7, wherein the first and second fixing portions of the supporting frame further comprise a jaw adjacent to the hole, and the protrusion of the receiving container is engaged with the jaw of the supporting frame and fixes the first and second fixing portions to the receiving container.

9. The display apparatus of claim 1, the receiving container further comprising a guide bar continuously extended from the bottom portion thereof to be spaced apart from the sidewall of the receiving container in the first direction and substantially parallel to the sidewall of the receiving container.

10. The display apparatus of claim 9, wherein the first and second sidewalls from which the first and second fixing portions of the supporting frame respectively extend are in a space between the spaced apart sidewall and guide bar of the receiving container, and are fixed to the receiving container.

11. The display apparatus of claim 1, further comprising a cover member which is coupled to the receiving container and overlaps an edge of the display unit.

12. The display apparatus of claim 11, wherein the receiving container and the cover member comprise a metal material.

13. The display apparatus of claim 1, wherein the backlight unit further comprises:

a light guide plate which receives the light through a side surface thereof and guides the light to the display unit.

14. The display apparatus of claim 1, wherein the supporting frame further comprises:

a supporter which is different from the first and second fixing portions and which extends from the first and second sidewalls of the supporting frame, substantially parallel to the bottom portion, to support the display unit, wherein the first and second sidewalls extend substantially vertical to the bottom portion from the supporter and guide the display unit, portions of each of the supporter, the first and second fixing portions and the first and second sidewalls of the supporting frame are absent at the light source, and the cover portion of the receiving container is exposed by the absent portions of the supporter.

15. The display apparatus of claim 1, further comprising a fixing member which is attached onto the cover portion of the receiving container, wherein the fixing member fixes the first and second fixing portions of the supporting frame to the cover portion.

* * * * *